Sept. 26, 1939. H. SCHMUTZ 2,174,139
CONTROLLING VALVE FOR FLUID PRESSURE BRAKES ON AUTOMOTIVE VEHICLES
Filed Sept. 28, 1935
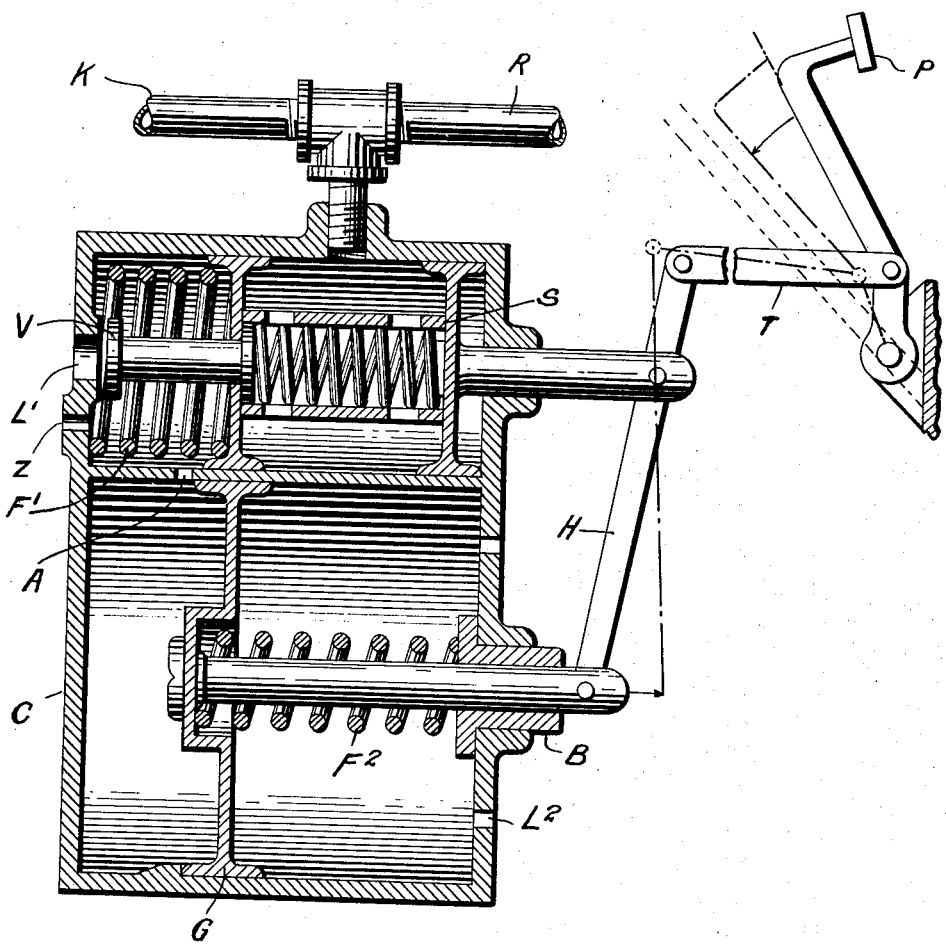
Inventor.
HANS SCHMUTZ Patented Sept. 26, 1939

2,174,139

UNITED STATES PATENT OFFICE 2,174,139

CONTROLLING VALVE FOR FLUID PRESSURE BRAKES ON AUTOMOTIVE VEHICLES

Hans Schmutz, Berne, Switzerland, assignor to Schmutz-Bremsen Aktiengesellschaft, Berne, Switzerland Application September 28, 1935, Serial No. 42,679 In Switzerland September 29, 1934

3 Claims. (Cl. 303—54)

My invention relates to a controlling valve mechanism for fluid pressure brakes on automotive vehicles of the kind adapted particularly although not exclusively for use in connection with automobile vehicles. The object of the present invention is to provide an improved mechanism of this character, whereby the control of the braking action shall be more effectively obtained. The invention relates more particularly to such controlling valve mechanisms, in which a valve body is controlled by an operable control piston connected to a physically operated part such as a brake pedal.

The invention consists in the provision of two adjacent chambers of cylindrical form in the common casing of the valve mechanism containing each a slidable piston, and both pistons being slidable in opposite directions and connected to a free rocking lever having unequal arms. One of said pistons serves as a control piston for closing an air inlet hole and opening a passage for a compressed air pipe line by means of the valve body, while the other serves as auxiliary piston designed for moving the pedal rod and the pedal forward proportional and corresponding to the gradual increasing force of the brake action.

Generally, controlling valves for fluid pressure brakes are provided with a compressible spring which is physically compressed according to the increasing pressure in the brake pipe line. This construction however has the drawback that the foot pedal may be depressed suddenly to the floor board without relation to the effective power exerted by the brake-shoes, so that the operator has no control, whether his brakes are acting or not. Gradual braking is nearly impossible, brake actions are effected by jerks and especially when nervous the driver may depress the pedal totally and block the brakes.

These drawbacks are avoided by my invention, in which a lever system is provided controlled by the auxiliary piston so as to force the brake lever and the pedal rod proportionally corresponding to the increasing braking force, giving the driver an increasing resistance on the pedal similar to mechanical foot braking. Each forward motion of the pedal lever effects simultaneously an intermittent shutting off of the compressed air passage and a small return movement of the control piston under the action of the auxiliary piston. In the mechanism embodying my invention a sudden depression of the pedal lever is impossible and only gradual depressions may be exerted resulting in a gradually increasing pressure in the pipe line and gradually increasing resistance on the foot pedal. Thus the operator has a permanent control over the working condition of his brake system and is enabled to determine the extent of power exerted by the control or actuator piston.

The auxiliary piston may be moved against a spring the force of which is proportional to pressure afforded for the braking and this spring may be adjusted by an adjusting screw, or the like.

An embodiment of the invention is shown by way of illustration in the accompanying drawing, which shows a sectional view of the controlling valve mechanism.

In the drawing the casing C of the controlling valve is fastened on the chassis of an automotive vehicle which is provided with brake mechanisms operated by compressed air of any well known construction.

The casing C contains two chambers in which a control piston S and an auxiliary piston G are slidably mounted. Both pistons are connected with each other by a free rocking lever H having unqual arms, one of these arms being linked to the pedal rod T of the pedal P.

The pistons are slidable in cylindrical chambers of the common casing C. The chambers are in communication with each other at A and have air inlet apertures $L_1$ and $L_2$ on opposite sides.

K is a connection to a compressed air pipe line supplied with compressed air by a compressor (not shown), R is a connection to a reservoir (not shown) and Z is the connection to the brake cylinder (not shown).

The control piston S is hollow and carries at one side a valve body, shown in the drawing as a double disc valve V the movement of which controls the air-port $L_1$ and a passage in the hollow control piston S for compressed air. In its initial position the control piston S is held by a coiled spring $F^1$ while the auxiliary piston G acting in opposite direction, is held in position by a coiled spring $F^2$.

By a depression of pedal P the pedal rod T and the control piston S are moved slightly forward against the action of spring $F^1$. The air inlet $L^1$ is then closed by the valve disc and the passage between compressed air pipe K, control piston chamber and auxiliary piston chamber is opened. The compressed air, flowing through the communicating hole from the control piston chamber to the auxiliary piston chamber moves the auxiliary piston G against the action of spring $F^2$ to the right, the free rocking lever H causing a return movement of the control piston S.

I claim:

1. In fluid pressure brakes for automotive vehicles, in combination with a pedal and a rod adapted to be actuated thereby, a control mechanism, comprising a casing having two communicating cylindrical chambers formed therein each being provided with an air port, a spring controlled control piston movably mounted in one of said chambers, a fluid pressure conduit in communication with said chamber, a spring-controlled auxiliary piston movably mounted in the other chamber and adapted to move in a direction opposite to said control piston, a double valve carried by said control piston and comprising an exhaust valve designed to close the airport in the chamber containing said control piston and an admission valve designed to permit fluid pressure to flow from said first chamber to said other chamber, each piston having an outwardly projecting piston rod, and a free rocking lever connecting said piston rods with each other and with said pedal actuated rod so as to cause after each depression of said pedal a partial return of said control piston to a lap position wherein the admission and exhaust valves both are closed and the braking pressure is maintained at some desired value.

2. In fluid pressure brakes for automotive vehicles, in combination with a pedal and a rod adapted to be actuated thereby, a control mechanism comprising a casing having two communicating cylindrical chambers formed therein each being provided with an air port, a spring-controlled control piston movably mounted in one of said chambers, a fluid pressure conduit in communication with said chamber, a spring-controlled auxiliary piston movably mounted in the other chamber and adapted to move in a direction opposite to said control piston, a double valve spindle movably arranged in said chamber, controlled by said control piston and comprising an exhaust valve designed to close the air port in the chamber containing said control piston and an admission valve designed to permit air under pressure to flow from said first chamber to said other chamber, each piston having an outwardly projecting piston rod, and a free rocking lever connecting said piston rods with each other and with said pedal actuated rod so as to cause after each partial depression of said pedal a momentary partial return of said control piston to a lap position wherein the admission and exhaust valves are closed and the braking pressure is maintained at some desired value.

3. In fluid pressure brakes for automotive vehicles, in combination with a pedal and a rod actuated thereby, a control mechanism, comprising a casing having two communicating cylindrical chambers formed therein each provided with an air-port, a spring-controlled hollow piston movably mounted in one of said chambers, a double disk-valve carried by said piston adapted to close the air-port in said chamber and open communication between the interior of said piston and said chamber, a fluid pressure conduit in communication with the interior of said piston, a spring-controlled auxiliary piston movably mounted in the other chamber, and adapted to move in a direction opposite to said first piston, each piston having an outwardly projecting piston rod, and a free rocking lever connecting said piston rods with each other and with said pedal-controlled rod, so as to cause after each depression of said pedal a momentary partial return of said first mentioned piston to a lap position wherein the admission and exhaust valves are closed and braking pressure is maintained at some desired value.

HANS SCHMUTZ.